May 16, 1967  J. O. FORD  3,319,533
HYDRAULIC OPERATING MEANS FOR HYDRAULIC BRAKES
Filed Sept. 2, 1965  2 Sheets-Sheet 1
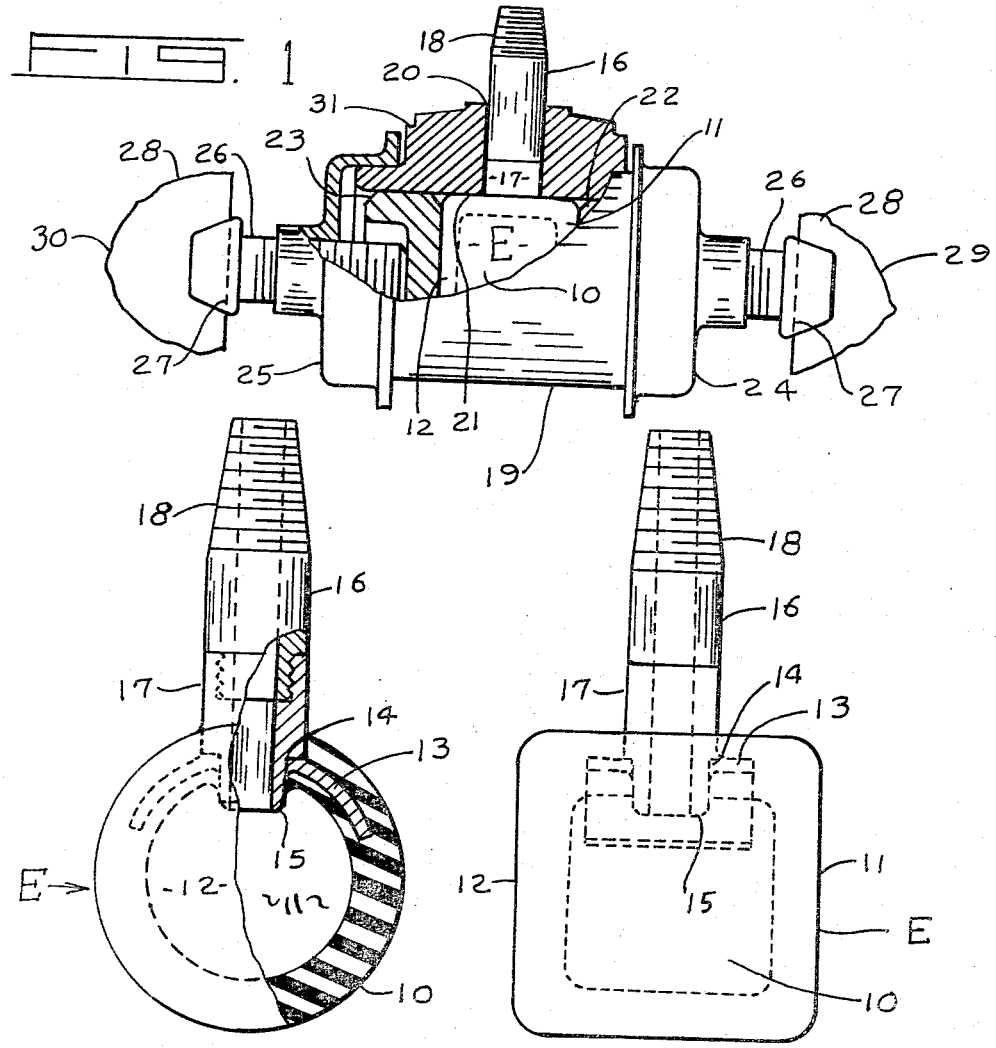
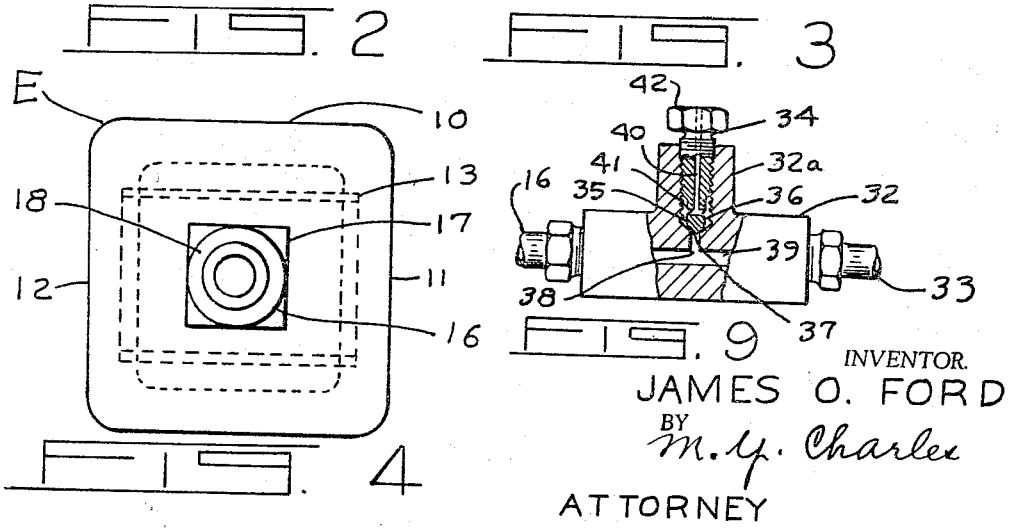
INVENTOR.
JAMES O. FORD
BY
M. P. Charles
ATTORNEY May 16, 1967  J. O. FORD  3,319,533
HYDRAULIC OPERATING MEANS FOR HYDRAULIC BRAKES
Filed Sept. 2, 1965  2 Sheets-Sheet 2

INVENTOR.
JAMES O. FORD
BY M. Y. Charles.
ATTORNEY

In the wall 10 and at the mid-portion thereof is a curved plate element 13 in an opening 14 in which is fitted a nipple portion 15 of a hollow stem element 16. The nipple portion 15 being made rigid with the plate 13 by means of welding or brazing and the like so as to form a liquid and air tight joint between the plate 13 and the nipple 15.

United States Patent Office 3,319,533
Patented May 16, 1967

3,319,533
HYDRAULIC OPERATING MEANS FOR HYDRAULIC BRAKES
James O. Ford, 712 Pennsylvania, Garden City, Kans. 67846
Filed Sept. 2, 1965, Ser. No. 484,666
2 Claims. (Cl. 92—75)

This invention relates to an improvement in hydraulic operating means for hydraulic brakes, such as is used perhaps most commonly in automobiles, trucks, truck tractors and the like.

In practically all of these vehicles there is a hydraulic cylinder in each brake structure and assembly whereby the brake shoes are operated to forcibly engage an associated brake drum and then be retracted to disengage the brake drum. As is well known, the piston plunger of the above mentioned cylinder is made of rubber or some similar material which through its rubbing action against the cylinder wall will become worn and then fit so loosely in the cylinder that the hydraulic fluid of the hydraulic brake system will leak past the plunger and the hydraulic system will become depleted of its hydraulic liquid and then the system and the brakes become inoperative.

In view of the above described trouble I have provided a new operating device to be used in the brake cylinder that is a sealed expansive element that can be placed in the cylinder and serve the same purpose as the plungers that are now in use and even if the new expansive element does wear during a long period of use it will still be sealed and the life of the braking system will be greatly increased because the leakage problem is eliminated.

A further object of my invention is to provide an expansive element of the kind mentioned that can be used to replace the worn cylinder plungers in the present day assemblages.

A still further object of the invention is to provide an expansive element of the kind mentioned that is easy to make, one that is sturdy, and long lived and one that is easy to install.

These and other objects of the invention will be more plainly and comprehensively described as this description progresses.

Now referring to the accompanying drawings in which similar numerals of reference designate the same parts as this description progresses.

FIG. 1 is a top plan view of the assembled device.

FIG. 2 is an enlarged detail end view of the expansive tube, parts being broken away and shown in section for purposes of illustration.

FIG. 3 is a side view of the expansive tube assembly.

FIG. 4 is a top plan view of the expansive tube shown in FIG. 3.

FIG. 9 is a side and partial sectional view of a bleeder device that may be used in either the device as shown in FIGS. 1 and 6.

Figure 5:
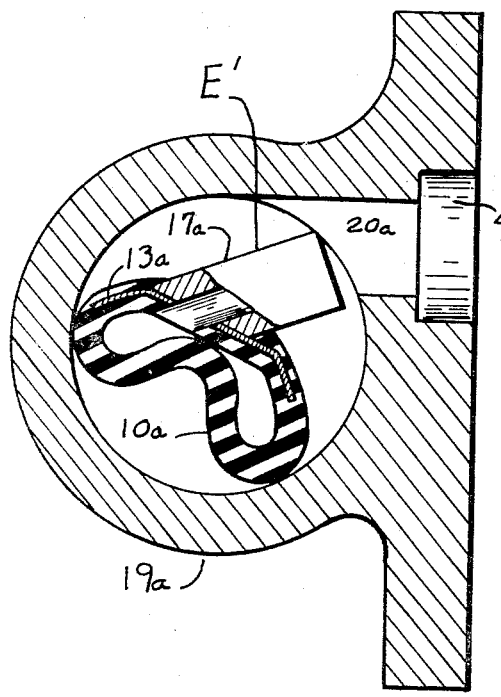
FIG. 5 is an enlarged sectional view of a modified form of the device.

The expansive element is made of a flexible, stretchable material such as rubber would be and is made in the form of a hollow cylindrical shape, having closed ends 11 and 12. The walls 10 and ends 11 and 12 are all made as one integral piece.

A portion of the stem 16 above the nipple 15 is multi-sided, preferably square, as indicated at 17 and the remainder of the stem 16 above the square 17 is preferably round and of such diameter that its circle is inscribed within the square 17, and the outside of the upper end of the hollow stem 16 is threaded to receive a tube or pipe fitting as indicated at 18.

The above described assemblage is designed so that the device can be slipped inside of a brake cylinder 19 and the stem 16, 17 and 18 will pass through a square hole 20 in the mid-portion of the cylinder 19 and the stem will project laterally from the cylinder 19 and the square portion 17 of the stem 16 will fit in the square opening 20 in the mid-portion of the cylinder 19 so as to prevent any turning of the stem 16 relative to the cylinder 19, the stem 16 being so assembled in the cylinder 19 that the circular wall 10 of the expansive element E will bear against the inner surface of the cylinder wall 21.

In each end of the cylinder 19 is slidably fitted a pair of cup or piston elements 22 and 23, the closed ends of which bear against the expansive end members 11 and 12 of the expansive element E. The cylinder 19 is provided with a pair of duplicate caps or closure elements 24 and 25 that are closely and slidably fitted, one on each end of the cylinder 19. Each cap 24 and 25 is provided with a stud 26 that is threaded through the center of the cap and the inner ends of which are seated within their respective cup elements 22 and 23. The outer end of the studs 26 are slotted as indicated at 27 to receive a tongue 28 on the end of a brake shoe, such as indicated at 29 and 30, so that as the expansive ends 11 and 12 of the expansive element E would expand or press outwardly as will later be described. The caps 24 and 25 and their respective studs 26 will move outwardly in opposite directions to separate the brake shoe ends 29 and 30 for the braking operation that is well known and need not be explained here.

Integrally formed on the side of the cylinder 19 is a mounting plate 31 which is adapted to be attached to any suitable frame portion of the brake housing structure so as to rigidly hold the cylinder 19 and the foregoing described assemblage in position to operate the brake shoes 29 and 30 as above mentioned.

After the cylinder 19 is mounted as above mentioned, the usual hydraulic pressure line (not shown) would be attached with the standard union or coupling to the upper threaded end 18 of the stem 16 and in making this connection, if there would be any tendency of the stem 16, to turn in the operation of connecting the pressure line to the stem 16, the square portion 17 would prevent any such turning action and prevent any injury or damage to the expansive element E.

A bleeder device as shown in FIG. 9 may be employed with the device as shown in FIG. 1 or the device shown in FIG. 6 which will later be described. The bleeder device as herein shown comprises a T-shaped fitting 32, one leg of which connects to the threaded portion 18 of the tube 16.

The opposite end of the tube 32 connects with pressure tube 33 and in the lateral leg 32a of the T-fitting 33 is threaded a stud 34, the lower end portion 35 of which is reduced in diameter and is drawn to a cone shape which is the needle 36 of a needle valve that is seatable in a valve seat 37 to open and close a passage 38 that connects into a longitudinal passage 39 through the line legs of the T-shaped element 32.

The valve screw 34 has a passage 40 drilled through the center axis of the screw 34 and connects with the transverse passage 41 that is drilled through the lower reduced portion 35 of the screw 34. The upper end of the screw 34 is provided with a suitable head, preferably a hexangular head 42 by which the screw 34 may be turned to raise and lower the needle valve 36 to open and close the bleeder passage 38 whereby any air that may be in the expansive element E may pass out through the passages 39, 38, 41 and 40 to bleed the system of any air that might be therein.

In FIGS. 5 to 8 inclusive is shown a modified form of the device that may be substituted as shown in FIGS. 1 through 4 inclusive. In FIG. 5 the device is shown as having the operating cylinder 19a in which is positioned the elastic, expansive, sealed element E' in the wall 10a of which is embedded a plate 13a from which extends a tubular element 17a, the outside of which is multisided, preferably square in cross section and is adapted to be fitted within a machined square passage 20a, one side of which is tangent with the circle of the cylinder wall 19a.

Figure 6:
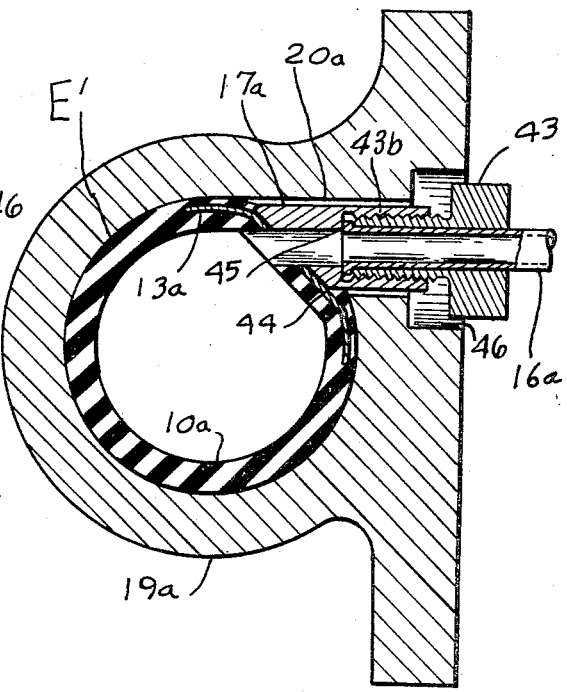
FIG. 6 is an enlarged, sectional view and illustrates the method of installation of the expansive element in the cylinder, showing a modified form of the device in its assembled position.
Figure 7:
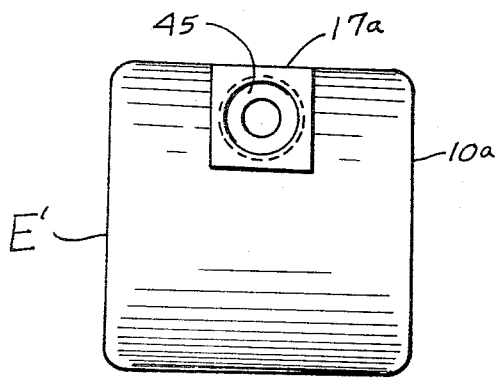
FIG. 7 is an enlarged detail side view of the expansive element employed in the modified form of the device.
Figure 8:
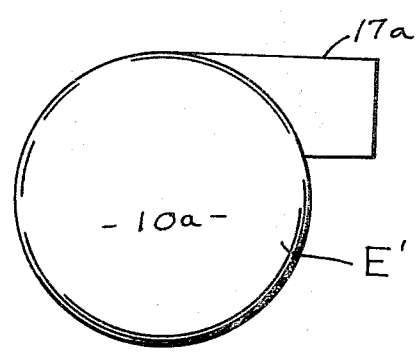
FIG. 8 is an end view of the device shown in FIG. 7.

To assemble the container E' in the cylinder 19a the container wall 10a may be passed through one end of the cylinder 19a until the tube 17a comes into registry with the opening 20a whereupon the tube 17a will enter and be seated in the square passage 20a, whereupon the container E' may be released and allowed to unfold to its normal position to fit against the circular wall of the cylinder 19a as shown in FIG. 6.

The outer end portion of the square passage 20a is counterbored to provide a circular extension 46 of the square passage 20a so as to revolvably receive a jam nut 43.

The outer end portion of the tubular element 17a is drilled to a larger diameter than the balance of the tube 17a and then threaded as shown at 43b to receive a jam sleeve 43 through which passes the pressure tube 16a, the lower end of which is flanged as shown at 44, so that the inner end of the jam sleeve 43 will bear on the tube flange 44 to form a tight joint between the jam sleeve 43, the flange 44 and a shoulder 45 formed in the tubular element 17a.

The tube 16a in FIG. 6 is the same as the tube 16 in FIGS. 1 to 9. Obviously the device shown in FIGS. 1, 2, 3 and 4 with slight alteration can be made to embody all of the advantageous features shown in FIGS. 5, 6, 7 and 8.

To prevent any turning of the stem 16 relative to the cylinder 19, the stem 16 being so assembled in the cylinder 19 that circular wall 10 of the expansive element E will bear against the inner surface of the cylinder wall 21.

Now in using the device, hydraulic pressure would be passed in the usual manner through the stem 16 and into the interior of the expansive element E, whereupon the end portions 11 and 12 would be forced to bulge outwardly and thereby move the studs 26 and their attached parts outwardly in opposite directions, whereupon they would move their respective brake shoe ends 29 and 30 to move the brake shoes to engage a brake drum in which they operate for braking purposes as is well known and understood, and upon the release of the hydraulic pressure in the expansive element E the studs 26 would be retracted toward each other in the usual manner to release the brakes.

In all hydraulic brake operating systems such as is being dealt with here, the systems have what is known as bleeder devices for the purpose of extracting air from the cylinder structures and that same bleeder means would operate to relieve the expansive element E of any air that might be therein, the same as it would in any other hydraulic system. Inasmuch as the studs 26 are threaded through their respective caps 24 and 25, the caps 24 and 25 can be revolved by hand or wrench if necessary to move their respective studs 26 in or out for brake shoe adjusting purposes, as will readily be understood.

Now while the device as shown and described is probably the preferred form of the device, it is to be understood that such modifications of the device may be employed as lie within the scope of the appended claims without departing from the spirit and intention of the invention.

Having fully described my invention, what I claim is:

1. A device for operating brake shoes; said device having and comprising in combination a cylinder, said cylinder having means thereon for rigidly attaching the cylinder in a fixed position to a supporting element therefor, said cylinder having both ends thereof open, the wall of said cylinder having a passage therethrough intermediate the ends of the cylinder, an expansible container having a cylindrical side wall and end walls, said container having a hollow fluid passage element sealed thereto and communicating with the interior of the container for the passage of fluid under pressure into and out of the said container, the inner end of said passage element having a plate means rigidly carried thereon, with said plate means being enclosed within the cylindrical side wall of said container, said plate means conforming to the shape of said cylindrical side wall, said container being positioned within the central portion of the cylinder and havng the side wall portion of the container bearing against the inner surface of the wall of the cylinder and having the hollow passage element passing through the said passage in the wall of the cylinder and co-operating means carried by both the cylinder and the hollow passage means to prevent rotary movement of the said hollow passage element in the said passage means through the wall of the cylinder, a pair of cap elements, one for and being longitudinal slidably positioned one on each end of the cylinder, a pair of threaded studs, said studs being threaded one through and on the center axis of each of said caps, a pair of cups, one for and being slidably positioned in each end of the cylinder and bearing against its adjacent and respective end portion of the said expansible container, one end of each stud being positioned in and bearing against its adjacent and respective cup for outward movement thereby, the end walls of said container expanding outwardly when under pressure, the other end of each of said studs having means thereon for engaging a brake shoe for the operation thereof.

2. A device as defined in claim 1, wherein said fluid passage enters the said cylinder at a point substantially tangent to the curve of the inner surface of the said cylinder.

References Cited by the Examiner
UNITED STATES PATENTS

| | | | |
|---|---|---|---|
| 1,776,288 | 9/1930 | Livingston | 92—92 |
| 1,884,373 | 10/1932 | Tatter | 60—54.6 |
| 2,046,140 | 6/1936 | White | 60—54.6 |
| 2,126,661 | 8/1938 | Provinson | 60—54.6 |
| 2,166,493 | 7/1939 | Hill | 92—92 |
| 2,298,007 | 10/1942 | Goepfrich | 92—50 X |
| 3,067,776 | 12/1962 | Love | 138—30 |

MARTIN P. SCHWADRON, *Primary Examiner.*

I. C. COHEN, *Assistant Examiner.*